UNITED STATES PATENT OFFICE.

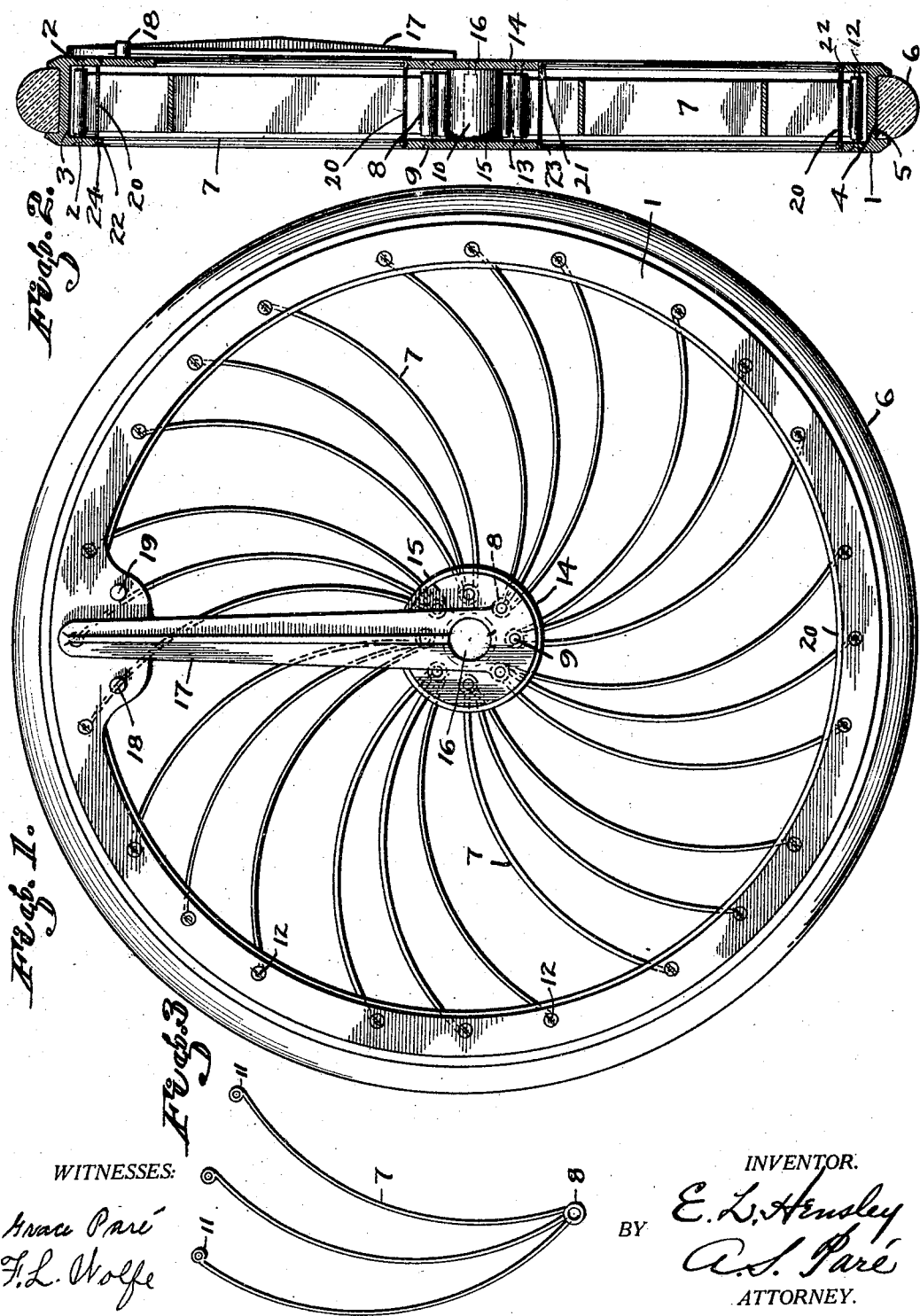

EDWIN L. HENSLEY, OF SAN FRANCISCO, CALIFORNIA.

VEHICLE WHEEL.

1,413,115.  Specification of Letters Patent.  Patented Apr. 18, 1922.

Application filed May 4, 1917. Serial No. 166,325.

*To all whom it may concern:*

Be it known that I, EDWIN L. HENSLEY, of San Francisco, California, have invented certain new and useful Improvements in Vehicle Wheels, whereof the following is a specification.

This invention relates to vehicle wheels in general but for the purpose of this application I shall describe the same as being particularly adapted to automobiles.

Among the objects sought to be accomplished are, to interpose between the traction rim and the hub, a plurality of flat, semi-elliptic, spring spokes to furnish a resilient support for the load; also to provide a means that will eliminate the use of pneumatic tires.

Other objects and advantages will appear as the description progresses.

In the drawing accompanying and forming a part of the present specification, and in which like reference characters indicate like parts, a simple form of the invention is shown.

In the one sheet of drawings:

Figure 1 is an elevational view of the inner side of the wheel constructed in accordance with this invention.

Figure 2 is a transverse central section through Figure 1, illustrating the pivotal means of fastening the spring spokes.

Figure 3 is a detail of the spoke.

In accordance with the drawing, the rim is designated in its entirety by the numeral 1 having the lateral spaced annular flanges 2—2 projecting inwardly from its inner face 3. On the outer periphery 4 of the rim 1, a recess 5 is formed for receiving a tread or tire 6. A solid tire is preferable to a pneumatic tire mainly from an economic standpoint, but it is to be understood that I am not confining myself to a solid tire. as any means for eliminating the noise and rattle may be used. Pivotally mounted within the flanges 2—2 are a plurality of spring spoke-leaves 7, semi-elliptic in shape, converging toward the eyelet 8, and pivotally connected by the bolt or pin 9 to the hub 10.

The hub 10 is formed of two flanges 13 and 14 joined by the sleeve 15 containing the aperture 16 for the axle of the vehicle. The flange 14 has the outwardly extending lever 17 formed thereon which engages the pins 18 and 19 on the rim 1, and stops its circumferential movement. This lever is also a means of applying circular motion to the rim through the hub.

When the wheel is subjected to any compression the springs will assume tensed positions. In this tensed position, a maximum point of movement will be reached. This limit will be the breaking point; but the lever 17 has during the operation engaged one of the pins 18 or 19 and thereby forms a positive means for controlling the circumferential movement of the rim 1, and prevent the breaking of the springs 7. A band 20 is tightly placed about the outer circumference of the hub 10 and the inner circumference of the rim 1, around the spring spokes 7, as at 20' and held in place by the wires 21 and 22 respectively, fitting the grooves 23 and 24 respectively on the flanges 13 and 14 of the hub and 2—2 of the rim as shown in Figure 2, to prevent any grit or dust from forcing its way in and interfering with the pivotal movements of the springs 7, at the points 9 and 12.

As shown in detail in Figure 3, the spring spokes 7 are composed of a plurality of members or leaves, in this case three being shown in each spoke. Each separate leaf has the eyelet 11 through which the countersunk studs or pins 12 are passed when the eyelets have been placed within the inwardly extending annular flanges 2—2 of the outer rim 1. At the three points of suspension 12 of each spring spoke 7 on the rim 1 and at the single point 9 on the hub 10, the retaining bolts are all smaller than the holes in the eyelets 11 and 12 so that when any weight is applied or the wheel receives a quick, hard thrust, the spring members 7 will be freely allowed to assume their compressed position without placing any undue strain on the separate leaves or spokes. The spring spokes 7 are preferably formed from separate pieces of material and may be welded together in some desirable and well known manner of the art.

The mode of operation is as follows: The hub 10 connected to the rim 1 by the interposed spoke means 7 and fixably mounted on the shaft or axle of the vehicle receives the load. Any obstruction or roughness occurring in the road that will affect the smooth running of the traction rim 1 will be taken up by the compression action of the pivotal trifurcated spokes 7. A limit of the circumferential movement of the rim 1 is controlled by the pins 18 and 19, which pins act as stops to the lever 17. Without this lever the hub could assume an eccentric position in reference to the rim which would not be conducive to the best efficiency of the wheel. The spokes flex in the plane of the circumference and are checked from any side thrust tendency by the hub flanges 13 and 14 and the annular flanges 2—2.

If the wheel is driven by a torque impulse imparted through the hub, the rotation is communicated through the spring spokes and the lever 17, limited to work between the pins 18 and 19, to the traction rim. The resiliency of the spokes protects the propelling mechanism from undue shock, by allowing relative rotation between the hub and the rim, which tends to expand or contract the spokes according to which direction the rotation is directed.

The principal disadvantage with spring wheels is, the tendency of the spring spokes to crystallize and break. This crystallization comes from a constant pressure and alternate flexing of the spring members in and out under a heavy load. This objection is overcome in my wheel by the fact that the spoke members are of a very thin formation and are so light in weight that a great number can be used in the supporting members also with the thin spring spoke, the spoke members can be added until a suitable limit has been reached for the load supporting capacity.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to-wit:—

The combination with the rim and hub members of a wheel of a plurality of resilient spokes interposed between the said members, each spoke consisting of a plurality of leaf sections rigidly secured to an eyelet member at the hub end, said eyelet member pivotally connected to the hub member, said spoke sections diverging from the eyelet and having their outer ends independently pivoted to the rim member.

In testimony that I claim the foregoing I have hereto set my hand this 23d day of April, 1917, in the presence of witnesses.

EDWIN L. HENSLEY.

Witnesses:
 LOUISE BEARDEN,
 FLORENCE L. WOLFE.